(No Model.)
F. GRINNELL.
VALVE.
No. 249,612. Patented Nov. 15, 1881.
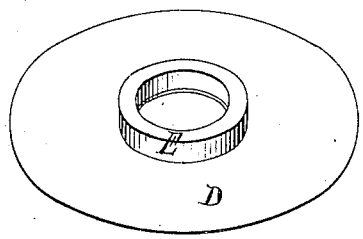
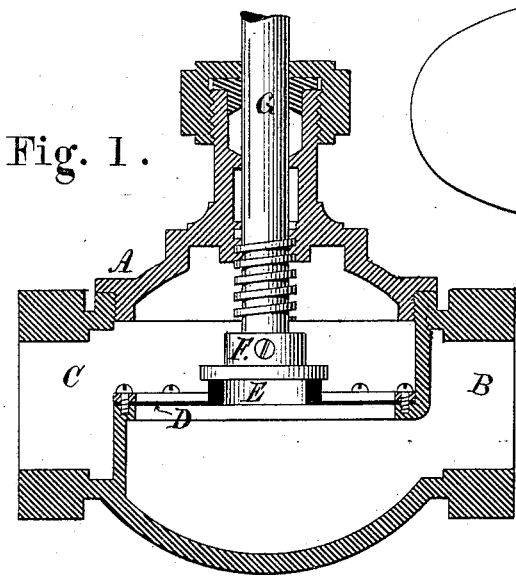
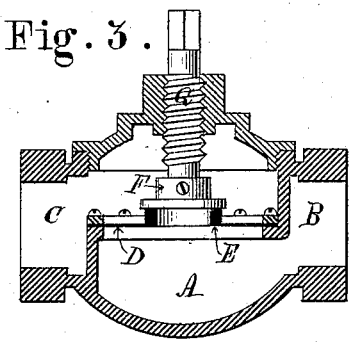
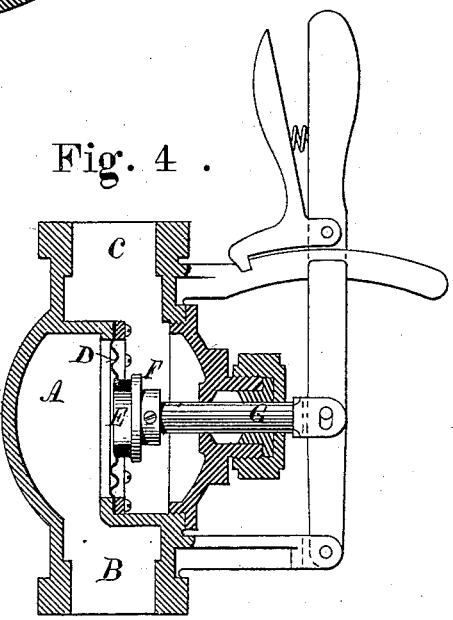
WITNESSES:
Joseph A. Miller Jr
Wm. L. [signature]
INVENTOR:
Frederick Grinnell
by Joseph A. Miller Atty

UNITED STATES PATENT OFFICE.

FREDERICK GRINNELL, OF PROVIDENCE, RHODE ISLAND.

VALVE.

SPECIFICATION forming part of Letters Patent No. 249,612, dated November 15, 1881.

Application filed June 13, 1881. (No model.)

*To all whom it may concern:*

Be it known that I, FREDERICK GRINNELL, of the city and county of Providence, and State of Rhode Island, have invented a new and useful Improvement in Valves; and I hereby declare that the following is a full, clear, and exact description of the same, reference being had to the accompanying drawings, forming part of this specification.

This invention has reference to an improvement in all kinds of valves in which a valve is held to its seat so as to make a tight joint; and it consists in providing such a valve with a diaphragm on which the valve-seat is secured so that the pressure on the diaphragm will press the seat against the valve, and thus insure a tight fit.

In all kinds of valves when the valve is to be closed against an internal pressure considerable force is required to bring the valve sufficiently tight against the seat to prevent leakage. The force so expended causes strain and injury to the structure, and valves are soon worn out so as to require repairing. When a valve has been by such force made tight it is often and usually caused to leak from a variety of causes, one of which is change in the temperature of the valve and another varying internal pressure.

The object of this invention is to overcome all of these difficulties and to produce a durable valve in which the pressure itself shall insure the valve against leakage rather than cause the same.

Figure 1 is a sectional view of my improved valve, showing the valve-seat secured to a thin diaphragm. Fig. 2 is a perspective view of the diaphragm provided with the valve-seat. Fig. 3 is a sectional view of a simple globe-valve without a stuffing-box, provided with a valve-seat secured to a yielding diaphragm. Fig. 4 is a sectional view of a lever-valve provided with a valve-seat secured to a yielding diaphragm, the diaphragm being shown corrugated, so as to make it more flexible.

In the drawings, A is the valve-case.

B is the inlet, and C the outlet.

D is the yielding diaphragm, which is made of such material as will best answer for the purposes for which the valve is to be used—that is to say, for ordinary water-pressure a rubber diaphragm would answer, whereas for a higher pressure a brass disk would make a better diaphragm. In this connection it is to be understood that the motion of the diaphragm is to be very slight, only sufficient to prevent leakage when the valve is practically in its proper place and is firmly held, for as soon as the valve is raised the fluid or whatever it may hold will pass through the valve.

E is the valve-seat secured to the diaphragm.

D F is the valve-disk operated by the valve-stem G.

In a valve of this construction a fixed stop may be provided, so that the valve-disk will move only against the valve-seat and the pressure on the diaphragm will keep the valve tight under all the variations or changes a valve may be subjected to without any strain on the valve, the valve-stem, or the seat. Such a valve is of great value for all places where valves are used, but most particularly so in automatic fire-extinguishers, where a valve is held to its seat and released by the action of heat, usually upon some readily fusible or yielding material. Such valves are liable to leak from ordinary changes in temperature, and also liable to not act in case of a fire, because the slightest yielding of the retaining material will cause the valve to leak, and the leaking will prevent the heat from acting on the retaining material, thus preventing the final release of the valve and the successful action of the device.

With my improved yielding diaphragm the valve will not leak until it is entirely released and the valve opened the full width.

Having thus described my invention, I claim as new and desire to secure by Letters Patent—

The combination, substantially as before set forth, of the valve-case, the valve constructed to be seated and unseated from the exterior of the case, and a yielding diaphragm secured within the case and provided with an aperture encircled by a valve-seat, which, when the valve is seated, is held against said valve by internal pressure against the diaphragm at the side opposite the valve.

FREDERICK GRINNELL.

Witnesses:
 J. A. MILLER, Jr.,
 WM. L. COOP.